United States Patent
Kainuma et al.

(10) Patent No.: US 6,943,971 B2
(45) Date of Patent: Sep. 13, 2005

(54) SLIDER TESTER

(75) Inventors: Norio Kainuma, Kawasaki (JP);
Hidehiko Kira, Kawasaki (JP); Shinji Hiraoka, Kawasaki (JP); Hirokazu Yamanishi, Kawasaki (JP); Atsushi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 10/348,680

(22) Filed: Jan. 21, 2003

(65) Prior Publication Data

US 2004/0036994 A1 Feb. 26, 2004

(30) Foreign Application Priority Data

Aug. 26, 2002 (JP) ...................................... 2002-245428

(51) Int. Cl.[7] .............................................. G11B 27/36
(52) U.S. Cl. ........................................................ 360/31
(58) Field of Search .......................... 360/245.3, 245.6, 360/31, 53, 75; 324/158.1

(56) References Cited

U.S. PATENT DOCUMENTS 6,459,260 B1 * 10/2002 Bonin et al. ............. 324/158.1

FOREIGN PATENT DOCUMENTS

| JP | 6-259738 | 9/1994 |
|---|---|---|
| JP | 07-10857 | 2/1995 |
| JP | 10-269503 | 10/1998 |
| JP | 11-86482 | 3/1999 |

\* cited by examiner

*Primary Examiner*—David Hudspeth
*Assistant Examiner*—Glenda P. Rodriguez
(74) *Attorney, Agent, or Firm*—Greer, Burns & Crain, Ltd.

(57) ABSTRACT

The slider tester is capable of solely testing a slider and securely selecting good sliders so as to reduce wasteful costs. The slider tester, which tests reading and writing functions of a slider for reading data from and writing data on a recording medium, includes a testing device for testing the functions of the slider, and a setting plate holding the slider and electrically connecting the slider to the testing device. The setting plate separates the slider a prescribed distance from the recording medium during the test so as to read data from and write data on the recording medium, wherein the slider can be independently attached to and detached from the setting plate.

13 Claims, 6 Drawing Sheets

SLIDER TESTER

BACKGROUND OF THE INVENTION

The present invention relates to a slider tester, which tests reading and writing functions of a slider (a magnetic head) for reading data from and writing data on a recording medium.

The slider for reading data from and writing data on a recording medium, e.g., a magnetic disk, is tested, then it is actually assembled in, for example, a magnetic disk drive unit. In the test, the recording medium is rotated, and floating characteristics and recording and writing functions of the slider are checked. In the conventional function test of the slider, a slider unit including the slider and a suspension, on which the slider is mounted, is assembled, then the slider unit is set in the slider tester so as to execute the function test. In the conventional slider tester, the recording medium is rotated so as to float the magnetic head therefrom, and a floating distance and the reading and writing functions of the slider are checked, so that the slider is judged if it is a good slider or a bad slider. The bad slider is scrapped together with the suspension.

Note that, in the present specification, the word "float" means the action of the slider moving away from a surface of the recording medium. Namely, the slider may be moved not only upwards with respect to the surface of the recording medium but also downwards and sidewards.

If the rate of producing bad sliders is high, many sliders are scrapped together with suspensions, so wasteful costs, e.g., costs of manufacturing sliders and suspensions and assembling slider units, are compounded. In the magnetic head for accessing a recording medium having a large capacity, the suspension has high functions and additional values. Therefore, the cost of manufacturing the suspension cannot be ignored. Further, the functions of the slider must be higher with increasing th capacity of the recording medium; high manufacturing technology is required, but yield of manufacturing sliders must be lower. Namely, the number of scrapped slider units and the wasteful costs are increased.

To solve this disadvantage, a method of testing the slider, in which the slider alone is tested before assembling the slider unit and only the good slider is mounted onto the suspension, is proposed. In the case of testing the, slider only, a recording medium is rotated and the slider is floated therefrom so as to check the floating distance and the reading and writing functions as well as the slider mounted on the suspension.

A lifting force of air, which is generated by rotating the recording medium, lifts or floats the slider from the recording medium; the suspension applies a pressing force, which is balanced with the lifting force, to the slider. Therefore, the floating distance of several tens nm from the recording medium can be maintained.

Namely, the slider tester must support the slider without obstructing the lifting force and apply the fixed pressing force to the slider. The slider must be easily set into and taken out from the slider tester before and after the test. The slider in a floating state must be electrically connected to a testing device.

SUMMARY OF THE INVENTION

An object of the present invention is to provide a slider tester, which is capable of solely testing a slider under conditions as well as a slider mounted on a suspension and securely selecting good sliders so as to reduce wasteful costs.

To achieve the object, the present invention has the following structures.

Namely, the slider tester, which tests reading and writing functions of a slider for reading data from and writing data on a recording medium, comprises: a testing device for testing the functions of the slider; and a setting plate holding the slider and electrically connecting the slider to the testing device, the setting plate separating the slider a prescribed distance from the recording medium during the test so as to read data from and write data on the recording medium, wherein the slider can be independently attached to and detached from the setting plate.

With this structure, the slider can be correctly solely tested under the conditions as well as a slider mounted on a suspension, and the results of the test can be correctly judged. Since the slider can be solely tested, the costs of manufacturing the suspension and assembling a slider unit can be omitted so that manufacturing cost can be effectively reduced. Further, by reducing the wasteful costs, the manufacturing cost of the slider for accessing a recording medium having high recording density can be reduced.

In the slider tester, the setting plate may comprise: a gimbal made of a metal plate having a slit, the gimbal moving the slider to and away from the recording medium and inclining the slider in optional directions; a fixed base section, to which the slider is detachably attached, being attached to the gimbal; and a press pin biasing the fixed base section toward the recording medium. With this structure, the slider can be inclined in the optional directions according to a suspension on which the slider will be mounted, and a pressing force can be applied to the slider while the slider is floated.

In the slider tester, the setting plate may comprise: a gimbal made of an elastic metal plate having a slit, the gimbal biasing the slider with a fixed elastic force and inclining the slider in optional directions; and a fixed base section, to which the slider is detachably attached, being attached to the gimbal. With this structure, the function of he suspension can be gained without using the press pin, so that a structure of the setting plate can be simplified.

In the slider tester, a contact part of one of the fixed base section and the press pin may be formed into a smooth spherical shape. With this structure, the gimbal can be moved freely, and the pressing force can be stably applied without reference to a posture of the gimbal.

In the slider tester, the setting plate may be attached to an arm section, and the arm section may be detachably attached to a mounting base fixed to a body proper of the slider tester. With this structure, the slider can be easily attached and detached, therefore a mechanism for attaching and detaching the slider can be more freely designed.

In the slider tester, the setting plate may be attached to an arm section, the arm section may be detachably attached to an arm plate, and the arm plate having the press pin may be detachably attached to a mounting base fixed to a body proper of he slider tester. By providing the press pin in the arm plate, a floating structure of the setting plate can be simplified. Especially, in the case of having a plurality of arm sections so as to test many sliders, the cost of manufacturing the setting plate and the arm sections an be reduced.

The slider tester may further comprise a height adjusting mechanism for adjusting the height of the mounting base and/or a direction adjusting mechanism for adjusting a direction of a surface of the mounting base. With this structure, the degree of parallel and a distance between the slider and the recording medium can be easily adjusted.

The slider tester may further comprise: a position adjusting mechanism for adjusting a position of the arm section;

a detecting section for detecting a position of the slider set on the setting plate; and a control section feeding back a detection result of the detecting section so as to correctly position the slider. With this structure, the degree of parallel and the distance between the slider and the recording medium can be automatically adjusted even if they are varied, so that highly precise test can be executed.

In the slider tester, cable patterns, which electrically connect the slider held on the fixed base section to the testing device, may be provided on the gimbal. With this structure, the thin and fine cable patterns can be formed. If toughness improved by the cable patterns is previously considered when toughness of the gimbal is designed, an optimum shape of the gimbal can be designed.

In the slider tester, the fixed base section may include: a contact block, on which a face of the slider including electric terminals is pressed so as to electrically connect the slider to the testing device; and a clamp spring elastically clamping the slider with the contact block. With this structure, the slider can be attached and detached in a limited space.

In the slider tester, an anisotropic electric conductive sheet may be adhered on the face of the contact block including the terminals. With this structure, the slider can be stably electrically connected to the contact block even if the slider is inclinedly set.

In the slider tester, the clamp spring may comprise: a fixed art being fixed to the fixed base section; a pressing part for pressing the slider toward the contact block, the pressing part being extended from the fixed part and including a free end; and a U-shaped bent part connecting the fixed part with the pressing part. With this structure, the clamp spring can be small-sized, the clamp spring can be moved to sufficiently attach and detach the slider, and durability of the clamp spring can be improved.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
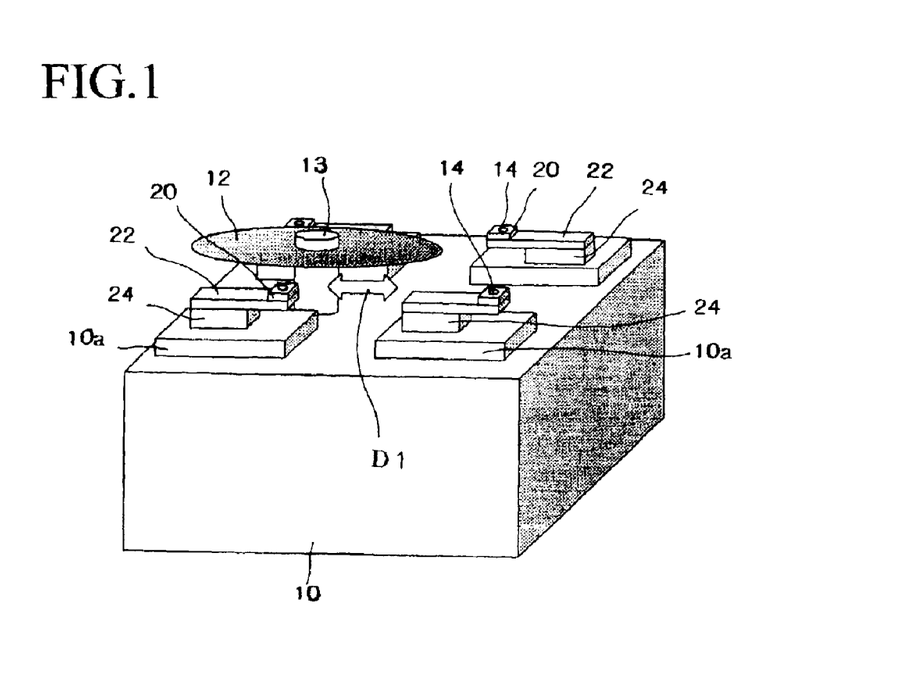
FIG. 1 is a schematic view of a slider tester of an embodiment of the present invention.

FIG. 1 is a schematic view of a slider tester of the present embodiment. A body proper 10 of the slider tester includes: a driving section for rotating a recording medium 12 as well as an actual disk drive unit; a travel control section for moving the recording medium 12 toward test positions, at each of which the slider 14 is set; and a testing device, which tests reading and writing functions of each slider 14 for reading data from and writing data on the recording medium 12.

Setting sections, to each of which the slider 14 to be tested is set, are provided to each corner of an upper face of the body proper 10. The recording medium 12, e.g., a magnetic disk, is supported by a spindle 13, which is provided between the setting sections located on a front side and those located on a rear side with prescribed separations. The spindle 13 can be moved in a direction D1 together with the recording medium 12. Namely, two sliders 14 can be tested when the recording medium 12 is located at a right end of a stroke or a left end thereof.

Each setting section includes: a setting plate 20 supporting the slider 14; an arm section 22 supporting the setting plate 20; and a mounting base 24 supporting the arm section 22. The mounting base 24 is fixed to a setting table 10a. A pair of the arm sections 22, which are located on the right side or the left side, are extended in the opposite directions from the mounting bases 24 so as to flow air in the same direction with respect to the sliders 14 to be tested.

The recording medium 12 is supported in a horizontal plan by the spindle 13. As described above, the spindle 13 is provided between the setting sections located on the front side and those located on the rear side with prescribed separations, and it can be moved in the direction D1 together with the recording medium 12. By moving th recording medium 12 supported by the spindle 13 in the direction D1, all of the sliders 14 an be tested. Each slider 14 can be solely attached to and detached from the setting plate 20. By attaching the sliders 14 to the setting plates 20 in order, the sliders 14 can be solely tested.

Figure 2:
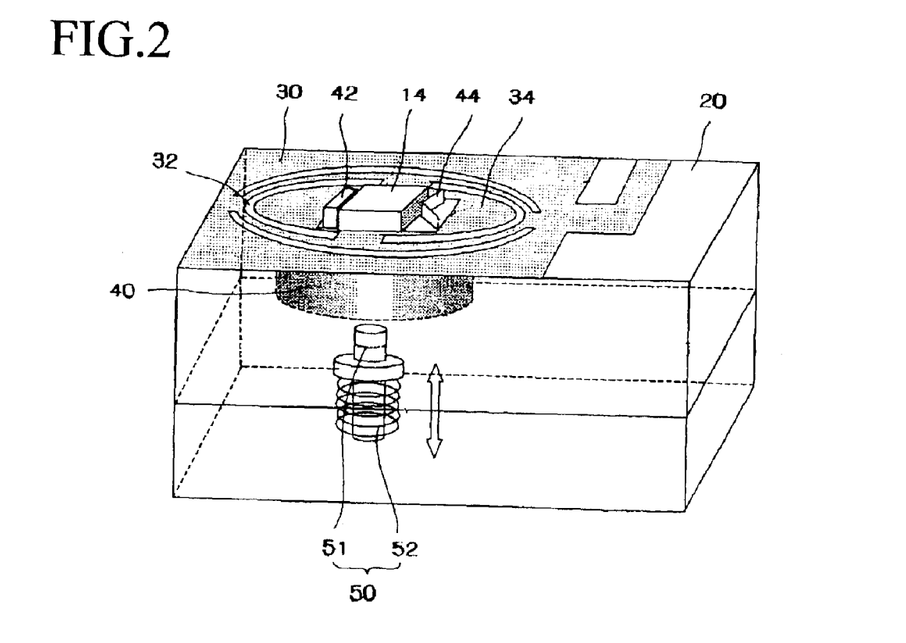
FIG. 2 is an explanation view showing a setting plate supporting a slider.

In FIG. 2, the slider 14 is set on the setting plate 20.

The setting plate 20 includes: a gimbal 30 supporting the slider 14 in a state of floating from a surface of the recording medium 12; a fixed base section 40 detachably holding the slider 14; and a press mechanism 50 pressing and supporting the fixed base section 40. Note that, in the present embodiment, the gimbal 30 supports the slider 14 under the recording medium 12 as the floating state.

The gimbal 30, the fixed base section 40 and the press mechanism 50 will be explained in order.

(The Gimbal)

The gimbal 30 supports the slider 14, which has been supported by the fixed base section 40, and allows the slider 14 to incline in optional directions, e.g., a pitching direction and a rolling direction. The gimbal 30 is made of a thin metal plate, and it has arc-shaped slits 32 so as to allows the slider 14 to incline in optional directions. An outer edge of the gimbal 30 is adhered on an upper face of the setting plate 20. There is formed a space, in which the fixed base 40, etc. are provided and the fixed base section 40 can be inclined, under the gimbal 30. Examples of the slits 32 of the gimbal 30 are shown in plan views of FIGS. 3A and 3B. In each example, a setting section 34, to which the slider 14 is set, is provided at a center of the gimbal 30, and an inner slit(s) 32a and an outer slit(s) 32b are coaxially formed with respect to a center of the setting section 34.

Figure 3A:
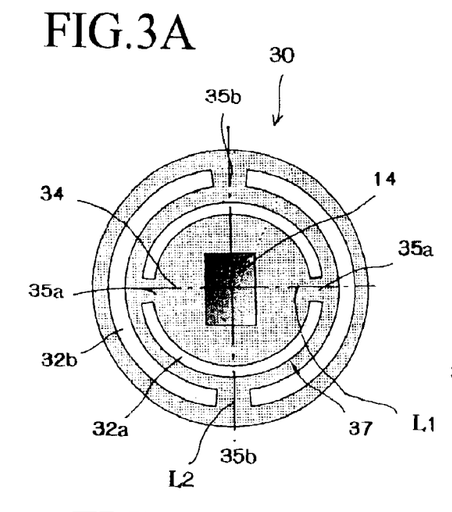
FIGS. 3A and 3B are plan views of a gimbal having slits.

In FIG. 3A, a pair of the inner slits 32a and a pair of the outer slits 32b are formed into half-arc shapes. Inner connecting sections 35a, which are symmetrically arranged with respect to the setting section 34, and outer connecting sections 35b, which are also symmetrically arranged with respect to the setting section 34, are arranged with angular separations of 90 degrees. By crossing a line L1 connecting the inner connecting sections 32a and a line L2 connecting the outer connecting sections 32b at the right angle, the setting section 34 can be supported and inclined in optional directions.

Figure 3B:
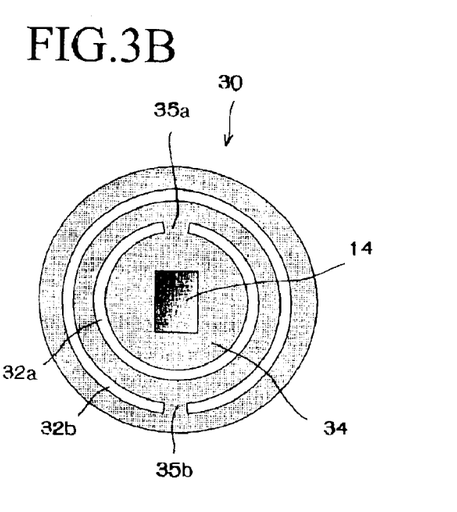

In FIG. 3B, the arc-shaped inner slit 32a and the arc-shaped outer slit 32b nearly enclose the setting section 34. The setting section 34 is supported by one inner connecting section 35a and one outer connecting section 35b. The connecting sections 35a and 35b are symmetrically arranged with respect to the setting section 34, so that the setting section 34 can be supported and inclined in optional directions.

Cable patterns are formed in the gimbal 30. The cable pattern electrically connects the slider 14 to a testing device 80, which is provided in the body proper 10.

Figure 4:
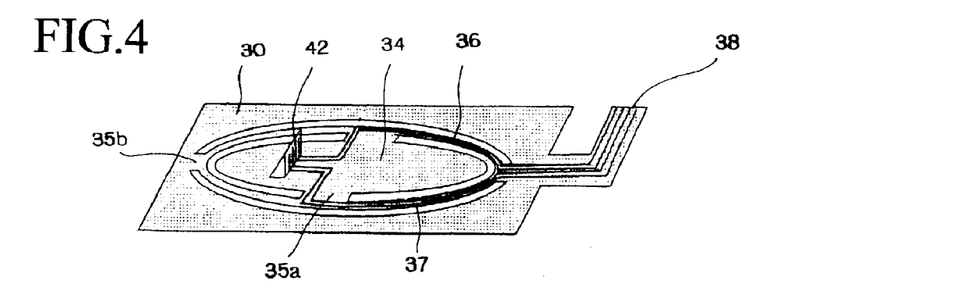
FIG. 4 is a perspective view of the gimbal, on which cable patterns are formed.

FIG. 4 is a perspective view of the gimbal 30 including the cable patterns 36. The cable patterns 36 are extended to terminals 38 via the inner connecting sections 35a, a rib 37 and the outer connecting section 35b. An insulating layer is formed on a surface of the gimbal 30, then an electric conductive film is formed on the conductive film so as to form the cable patterns 36 running through the rib 37, etc. Shapes of the cable patterns 36 may be optionally designed.

Figure 5:
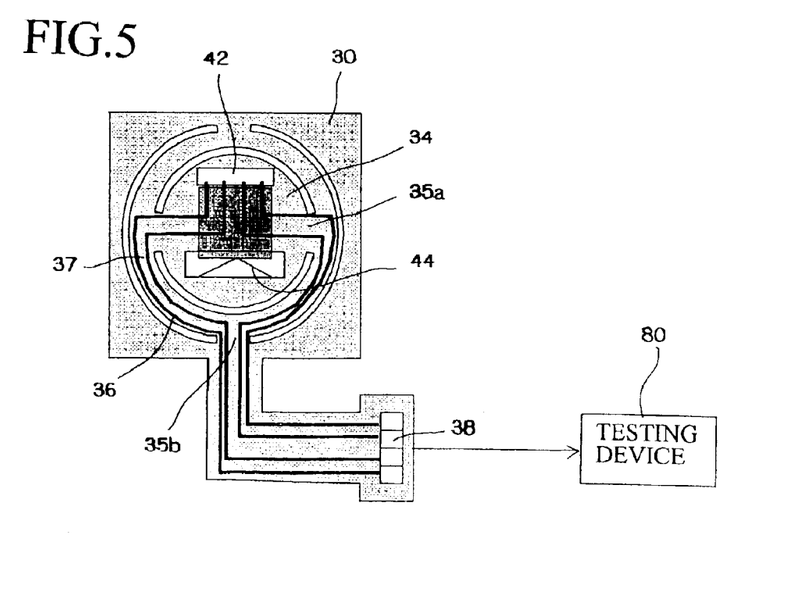
FIG. 5 is a plan view of the gimbal, on which the cable patterns are formed.

The slider 14 to be tested is set on the fixed base section 40 located at the center of the setting section 34. In FIGS. 4 and 5, a contact block 42 is provided in the gimbal 30. The contact block 42 electrically connects the cable patterns 36 to electrodes of the slider 14 when the slider 14 is set on the fixed base section 40. There are provided contact terminals in an inner face of the contact block 42. The contact terminals correspond to the electrodes of the slider 14, which are formed in a side face of the slider 14. By electrically connecting the cable patterns 36 to the contact terminals, the slider 14 can be electrically connected to the cable patterns 36 when the slider 14 is set on the fixed base section 40.

Another process of forming the contact terminals in th inner face of the contact block 42 will be explained. Firstly, the contact terminals are formed at ends of the cable patterns 36 by patterning. The contact terminals are formed at positions corresponding to the contact block 42 on the gimbal 30. A part of the gimbal 30, in which the contact terminals have been formed, is cut and vertically bent, so that t e contact block 42 including the contact terminals can be formed. The contact block 42 is extended upward from the gimbal 30, and an opening part is formed by bending th contact block 42 upward.

(The Fixed Base Section)

As shown in FIG. 2, the fixed base section 40 is fixed on a bottom face of the setting section 34, which is provided at the center of the gimbal 30. The fixed base section 40 has the contact block 42, to which the slider 14 is detachably attached, an a clamp spring 44 facing to the contact block 42. The contact block 42 and the clamp spring 44 are upwardly extended from an opening part of the gimbal 30. The heights of the contact block 42 and the clamp spring 44 are nearly equal to the thickness of the slider 14.

The clamp spring 44 elastically biases a side face of the slider 14, which is the opposite face of the face including the electrodes, toward the contact block 42, so that the slider 14 can be elastically clamped between the contact block 42 and the clamp spring 44. By elastically biasing the slider 14 toward the contact block 42, the electrodes of the slider 14 can be pressed onto the contact terminals of the contact block 42, so that the slider 14 can be securely electrically connected to the cable patterns 36.

Figure 6A:
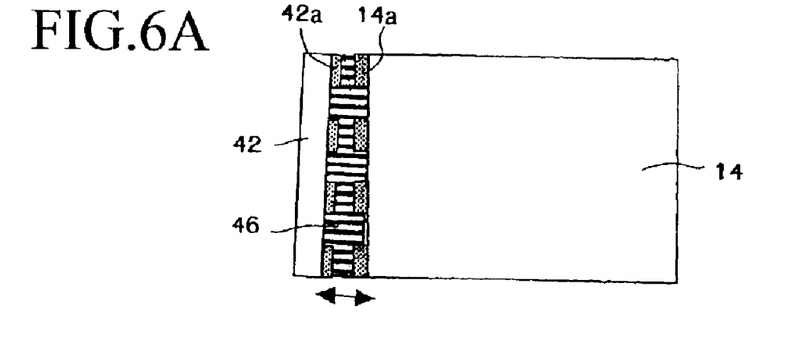
FIGS. 6A and 6B are explanation views in which the slider contacts terminals with anisotropic electric conductive sheet.
Figure 6B:
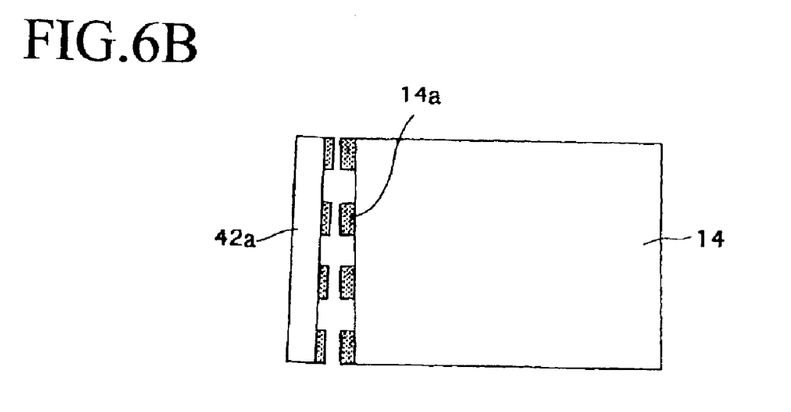

In an example shown in FIG. 6A, the electrodes 14a of the slider 14 are securely electrically connected to the contact terminals 42a of the contact block 42 even if the slider 14 is not correctly pressed when the clamp spring 44 presses the slider 14 onto the contact block 42. If the slider is diagonally pressed with respect to the contact block 42 as shown in FIG. 6B, a gap is formed between the electrodes 14a of the slide 14 and the contact terminals 42a of the contact block 42, so that the slider 14 is not electrically connected to the cable patterns 36.

In FIG. 6A, an anisotropic electric conductive sheet 46 is adhered on the face of the contact block 42, in which the contact terminals 42 are formed. A part of the anisotropic electric conductive sheet 46 compressed is capable of conducting electricity. Therefore, even if the slider 14 is diagonally pressed onto the contact block 42, a part of the anisotropic electric conductive sheet 46, which is compressed by the electrodes 14a and the contact terminals 42a, is capable of electrically connecting them. Namely, even if the slider 14 is slightly inclined when it is diagonally pressed onto the contact block 42 by the clamp spring 44, the anisotropic electric conductive sheet 46 is capable of securely electrically connecting the slider 14 to the cable patterns 36.

Figure 7:
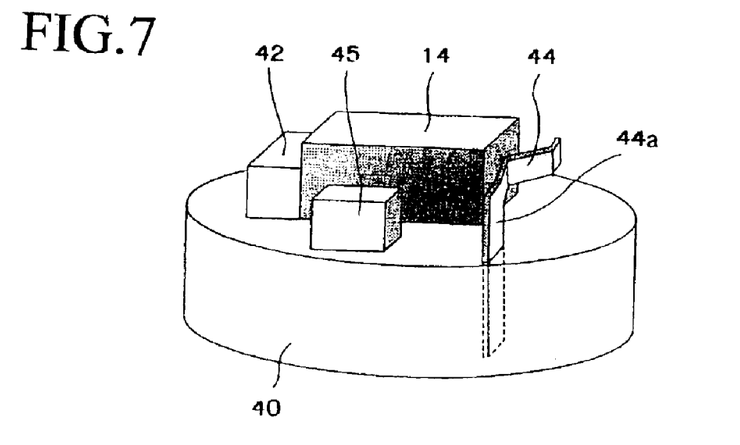
FIG. 7 is a perspective view of a fixed base section on which the slider is mounted.
Figure 8A:
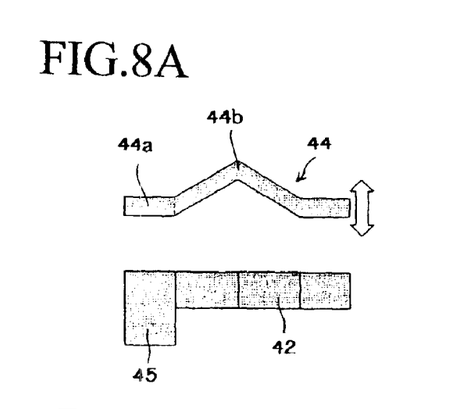
FIGS. 8A and 8B are explanation views of a clamp spring.
Figure 8B:
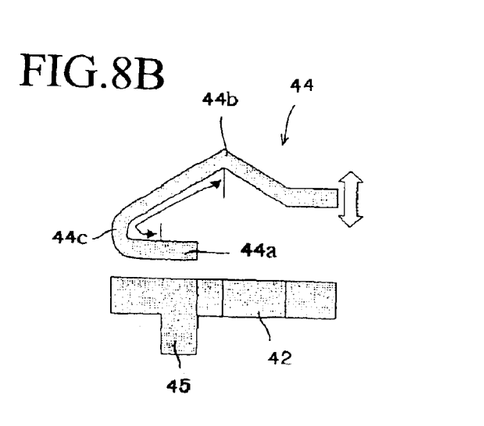

FIG. 7 is a perspective view showing the slider 14 mounted on the fixed base section 40. The clamp spring 44 is provided to face the contact block 42 on the upper face of the fixed base section 40, and a side stopper 45 is provided set and positioned at a prescribed position with respect to the contact block 42. FIGS. 8A and 8B show examples of the clamp spring 44. In FIG. 8A, a V-shaped pressing part 44b is extended from a fixed part 44a. A front end of the pressing part is a free end.

In FIG. 8B, the fixed part 44a and the V-shaped pressing part 44b are connected by a U-shaped bent part 44c. As clearly shown in FIG. 8B, in the case of supporting the pressing part 44b by the U-shaped bent part 44c, a distance between the fixed part 44a and the pressing part 44b can be longer than that of the clamp spring 44 shown in FIG. 8A. With this structure, a stroke of the clamping spring 44 for clamping and releasing the slider 14 can be long, so that the slider 14 can be easily attached and detached. Further, the clamp spring 44 is actuated within elastic limit, so a span of life of the clamp spring 44 can be extended.

By the U-shaped bent part 44c, the fixed part 44a can be located on the inner side of the pressing part 44b, so that the clamp spring 44 can be provided in a narrow space and bad influence to the floating characteristics can be restricted.

(The Press Mechanism)

As shown in FIG. 2, the press mechanism 50 has a press pin 51, which is provided under the center part of the fixed base section 40, and a coil spring 52, which covers the press pin 51. The coil spring 52 makes an upper end of the press pin 51 contact a bottom face of the fixed base section 40 so as to apply a pressing force which presses the slider 14 supported by the gimbal 30 onto the surface of the recording medium. By adjusting the elasticity of the coil spring 52, a load applied to the slider 14 is adjusted when the slider is floated by the rotation of the recording medium, so that a floating distance from the surface of the recording medium can be adjusted.

Figure 9A:
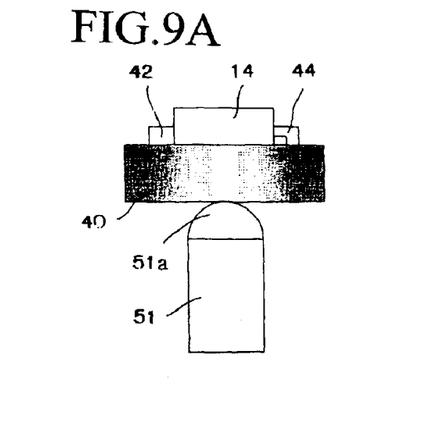
FIGS. 9A and 9B are explanation views of a press mechanism.

In FIG. 9A, an upper part 51a of the press pin 51 is formed into a smooth half-spherical shape. With this structure, the press mechanism 50 does not obstruct inclination of the slider 14 in optional directions.

Figure 9B:
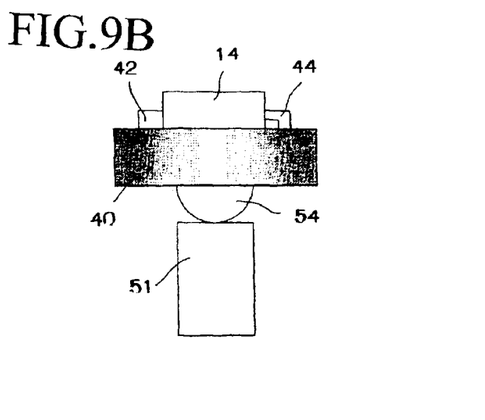

In FIG. 9B, an upper end of the press pin 51 is a flat face; a smooth half-spherical-shaped section 54 is expanded from the bottom face of the fixed base section 40 so as to contact the upper end of the press pin 51. Since the contact part of the fixed base section 40 or the press pin 51 is formed into a smooth spherical shape, the fixed base section 50 can be inclined in optional directions.

The press mechanism 50 applies the pressing force or load, which is equal to an elastic force applied to the slider 14 by a suspension, to the slider 14 when the recording medium 12 is rotated to execute the reading and writing function test. Note that, a structure of the press mechanism 50 is not limited to that shown in FIG. 2.

Figure 10:
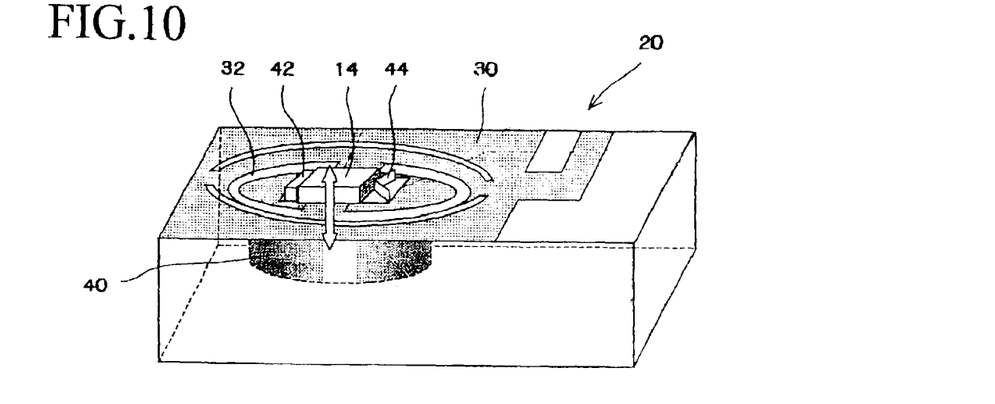
FIG. 10 is a schematic view of the setting plate of another example.

In another example of the press mechanism 50 shown in FIG. 10, the pressing force is applied to the slider 14 by elasticity of the gimbal 30 without using the press pin 51 and the coil spring 52. The gimbal 30 is made of an elastic member, e.g., a leaf spring, and the slits 32 are formed in the gimbal 30, so that the gimbal 30 can elastically apply a proper pressing force. The elastic pressing force applied by the gimbal 30 is used as a counter force against the lifting force for floating the slider 14, so that the floating distance of the slider 14 can be adjusted.

(The Mounting Base of the Setting Plate)

As described above, the slider 14 is detachably attached to the arm section 22 of the setting plate 20 for executing the test. A structure of the arm section 22 and the mounting base 24 is shown in FIGS. 11A and 11B.

Figure 11A:
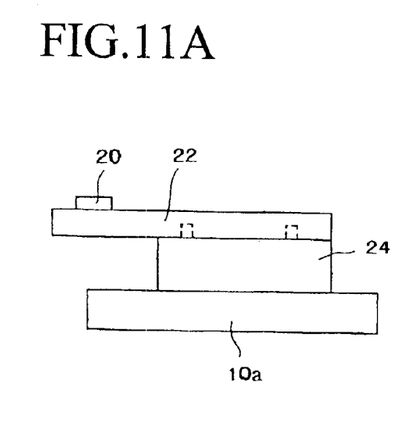
FIGS. 11A and 11B are explanation views of an arm section which is detachably attached to a mounting base.
Figure 11B:
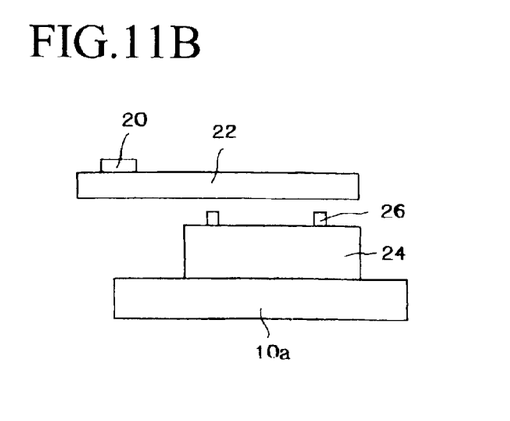

In FIG. 11A, the arm section 22 is set on the mounting base 24; in FIG. 11B, the arm section 22 is detached from the mounting base 24. Positioning pins 26 are provided so as to correctly position the arm section 22 on the mounting base 24.

The arm section 22, which has been correctly position on the mounting base 24, may be fixed by air suction.

Figure 12:
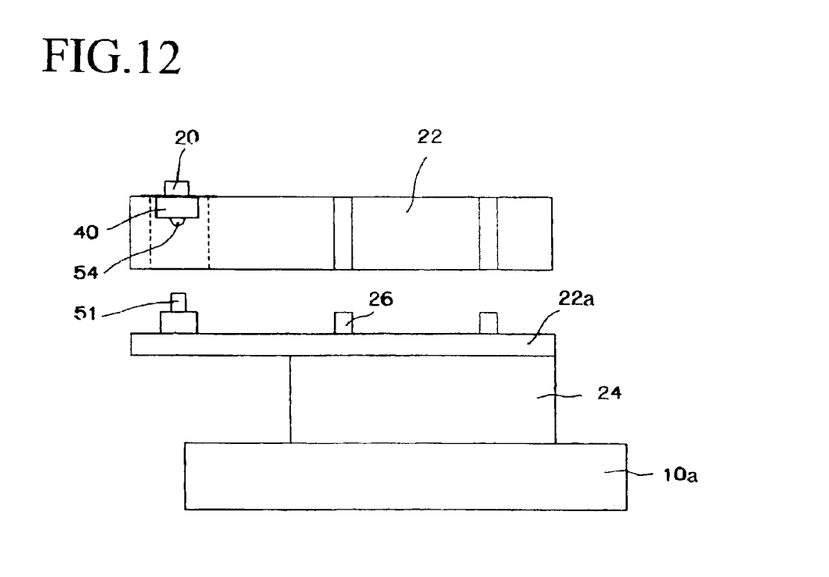
FIG. 12 is an explanation view of the arm section which is detachably attached to an arm plate.

Many types of the sliders 14 exist and their sizes, arrangement of the electrodes, etc. are different. Therefore, the gimbal 30, the contact block 42, the clamp spring 44, etc. of the setting plate 20 are different according to the sliders 14 to be tested. Thus, the arm section 22 can be separated from the mounting base 24 so as to exchange the arm section 22 and the setting plate 20 according to types of the sliders. Namely, many types of the sliders 14 can be effectively tested. In FIG. 12, an arm plate 22a is attached to the mounting base 24, and the arm section 22 is detachably attached to the arm plate 22a. The press pin 51 is provided to a front end part of the arm plate 22a, and the arm section 22 is set on the arm plate 22a. With this structure, the fixed base section 40 of the setting plate 20, which is set on the arm section 22, is pressed by the press pin 51. In this case too, the arm section 22 including the setting plate 20 can be exchanged to test many types of the sliders 14. In another case, the arm plate 22a may be exchanged to test many types of the sliders 14.

Figure 13:
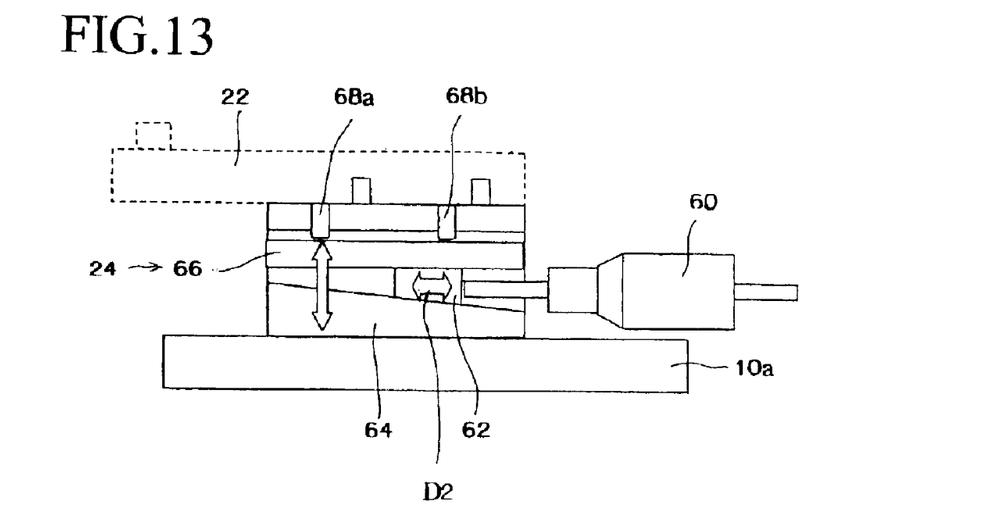
FIG. 13 is an explanation view of mechanisms for adjusting height and direction of the mounting base.

In FIG. 13, a height adjusting mechanism for adjusting the height of the mounting base 24 and a direction adjusting mechanism for adjusting a direction of a surface of the mounting base 24 are provided in the mounting base 24. A slide block 62 is pushed by a micrometer 60. A sloping plate 64 and a parallel plate 66 are provided. The slide block 62 is reciprocally moved in the direction D2 by the micrometer 60. Namely, the height of the mounting base 24 can be adjusted by adjusting the position of the slide block 62.

Adjust screws 68a and 68b are provided to adjust a direction or a heading of an upper surface of the mounting base 24. The direction of the upper surface of the mounting base 24 can be adjusted by adjusting projection length of the adjust screws 68a and 68b.

The thickness of the slider 14 and the distance between the slider 14 and the surface of the recording medium 12 are different according to the type of the sliders 14. The height adjusting mechanism and the direction adjusting mechanism are used to precisely adjust the height of the mounting base 24, etc. when the slider 14 to be tested is exchanged.

Figure 14:
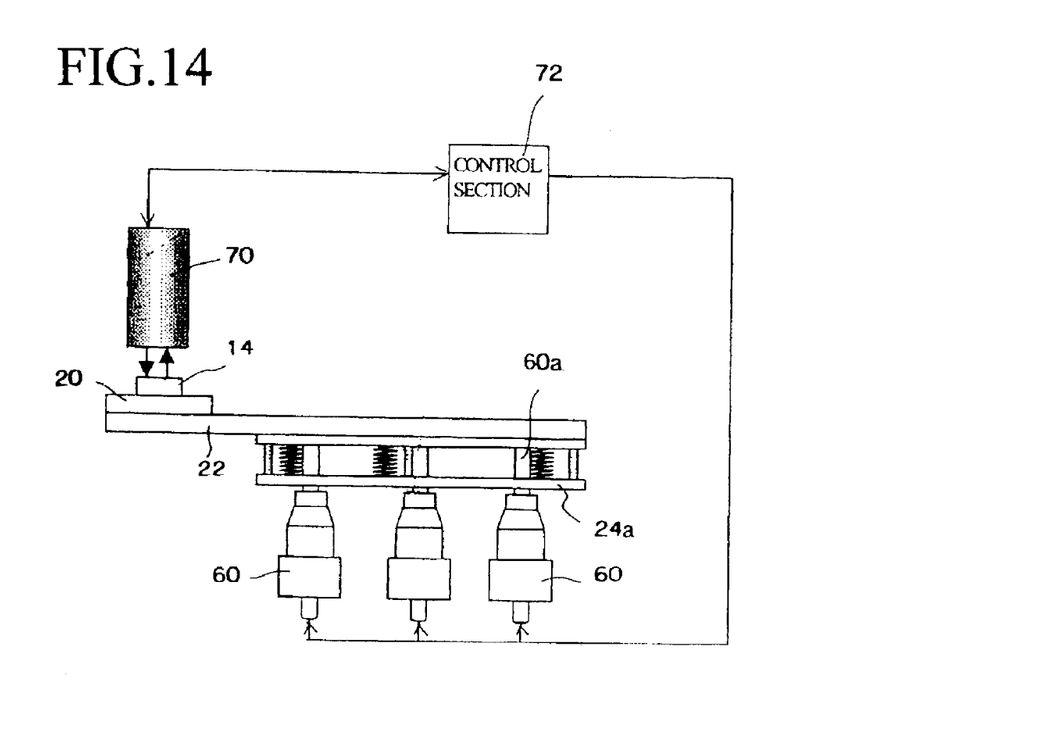
FIG. 14 is an explanation view of a mechanism for automatically adjusting direction of the slider.

An example in which arrangement of the arm section 22 claim can be automatically controlled is shown in FIG. 14. The position of the slider 14, which has been mounted on the setting plate 20, is detected and the arrangement of the arm section 22 is controlled on the basis of the results of the detection. A detecting section 70 detects a position, a height and inclination of the slider 14 set on the setting plate 20. The detecting section 70 detects the inclination of the slider 14, etc. by, for example, irradiating a laser beam toward the slider 14. A control section 72 controls the micrometers 60 on the basis of the detected inclination of the slider 14, etc. so as to position the slider 14 at the prescribed position Function rods 60a of the micrometers 60 are engaged between a base plate 24a, which is fixed to the body proper 10, and the arm section 22. With this structure, the height and inclination of the arm section 22 are adjusted by respectively adjusting the projecting length of the function rods 60a of the micrometers 60, so that the position of the slider 14 can be adjusted. The detecting section 70 actuates the micrometers 60, and the position of the slider 14 detected by the detecting section is fed back. By feed-back controlling the position of the slider 14, the position of the slider 14 can be correctly adjusted.

By the method of feed-back-controlling the position of the slider 14, deviation of positions of the arm section 22 and the setting plate 20 can be disappeared, and the slider 14 can be correctly set.

Note that, in the above described embodiment, the micrometer(s) 60 is used as the position adjusting mechanism for adjusting the position of the a section, but the position adjusting mechanism may be constituted by other means, e.g., an adjustment screw(s) driven by a servo motor(s).

In the slider tester, the slider 14 can be solely tested and easily attached to and detached from the setting plate 20, so that the efficiency of the slider test can be improved. The floating distance of the slider 14 from the surface of the recording medium 12 can be set as well as a slider mounted on an actual suspension. Therefore, the result of the reading and writing function test can be executed with proper accuracy, so that the sliders can be correctly judged. By securely selecting the good sliders, only the good sliders can be mounted onto actual suspensions, therefore efficiency and yield of manufacturing magnetic drive units can be improved. Further, manufacturing cost of magnetic drive units can be effectively reduced.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A slider tester, which tests reading and writing functions of a slider for reading data from and writing data on a recording medium, comprising:

a testing device for testing said functions of the slider; and a setting plate holding the slider and electrically connecting the slider to said testing device, said setting plate separating the slider a prescribed distance from the recording medium during the test so as to read data from and write data on the recording medium, wherein the slider can be independently attached to and detached from said setting plate; and wherein said setting plate includes:

a gimbal made of a metal plate having at least one slit, said gimbal moving the slider to and away from the recording medium and inclining the slider in optional directions; and a fixed base section, to which the slider is detachably attached, being attached to said gimbal; and further wherein said slider tester includes a press pin biasing said fixed base section toward the recording medium.

2. The slider tester according to claim 1, wherein a contact part of one of said fixed base section and said press pin is formed into a smooth spherical shape.

3. The slider tester according to claim 1, wherein said setting plate is attached to an arm section, and said arm section is detachably attached to a mounting base fixed to a body proper of said slider tester.

4. The slider tester according to claim 1, wherein
said setting plate is attached to an arm section,
said arm section is detachably attached to an arm plate, and
said arm plate having said press pin is detachably attached to a mounting base fixed to a body proper of said slider tester.

5. The slider tester according to claim 3 or 4, further comprising a height adjusting mechanism for adjusting height of said mounting base.

6. The slider tester according to claim 3 or 4, further comprising a direction adjusting mechanism for adjusting a direction of a surface of said mounting base.

7. The slider tester according to claim 3 or 4, further comprising:
a position adjusting mechanism for adjusting a position of said arm section;
a detecting section for detecting a position of the slider set on said setting plate; and
a control section feeding back a detection result of said detecting section so as to correctly position the slider.

8. A slider tester, which tests reading and writing functions of a slider for reading a data from and writing data on a recording medium, comprising:
a testing device for testing said functions of the slider; an
a setting plate holding the slider and electrically connecting the slider to said testing device, said setting plate separating the slider a prescribed distance from the recording medium during the test so as to read data from and write data on the recording medium,
wherein the slider can be independently attached to and detached from said setting plate; and
wherein said setting plate includes:
a gimbal made of an elastic metal plate having at least one slit, said gimbal biasing the slider with a fixed elastic force and inclining the slider in optional directions; and
a fixed base section, to which the slider is detachably attached, being attached to said gimbal.

9. The slider tester according to one of claims 1, 8, 2, 4, wherein cable patterns, which electrically connect the slider held on said fixed base section to said testing device, are provided on said gimbal.

10. The slider tester according to one of claims 1, 8, 2, 4, wherein said fixed base section includes:
a contact block, on which a face of the slider including electric terminals is pressed so as to electrically connect the slider to said testing device; and
a clamp spring elastically clamping the slider with said contact block.

11. The slider tester according to claim 10, wherein an anisotropic electric conductive sheet is adhered on the face of said contact block including the terminals.

12. The slider tester according to claim 10, wherein said clamp spring comprises:
a fixed part being fixed to said fixed base section;
a pressing part for pressing the slider toward said contact block, said pressing part being extended from said fixed part and including a free end; and
a U-shaped bent part connecting said fixed part with said pressing part.

13. The slider tester according to claim 8, wherein said setting plate is attached to an arm section, and said arm section is detachably attached to a mounting base fixed to a body proper of said slider tester.

* * * * *

UNITED STATES PATENT AND TRADEMARK OFFICE
CERTIFICATE OF CORRECTION

PATENT NO. : 6,943,971 B2
DATED : September 13, 2005
INVENTOR(S) : Kainuma et al.

It is certified that error appears in the above-identified patent and that said Letters Patent is hereby corrected as shown below:

<u>Column 9,</u>
Line 36, delete "an" and insert -- and --.

<u>Column 10,</u>
Lines 12 and 16, delete "claims 1, 8, 2, 4" and insert -- claims 1, 8, 2 or 4 --.

Signed and Sealed this

Eighteenth Day of April, 2006

JON W. DUDAS
*Director of the United States Patent and Trademark Office*